(12) United States Patent
Buckland

(10) Patent No.: X9687
(45) Date of Patent: Jun. 2, 1836

(54) CORSETS, RINGS, &C. , GROOVES IN

(76) Inventor: Charles Buckland

United States Patent
Patent No.: X9687
Sheet 1. 2 Sheets.
C. Buckland,
Cutting Corset Rings,
Patented Jan. 20, 1836.
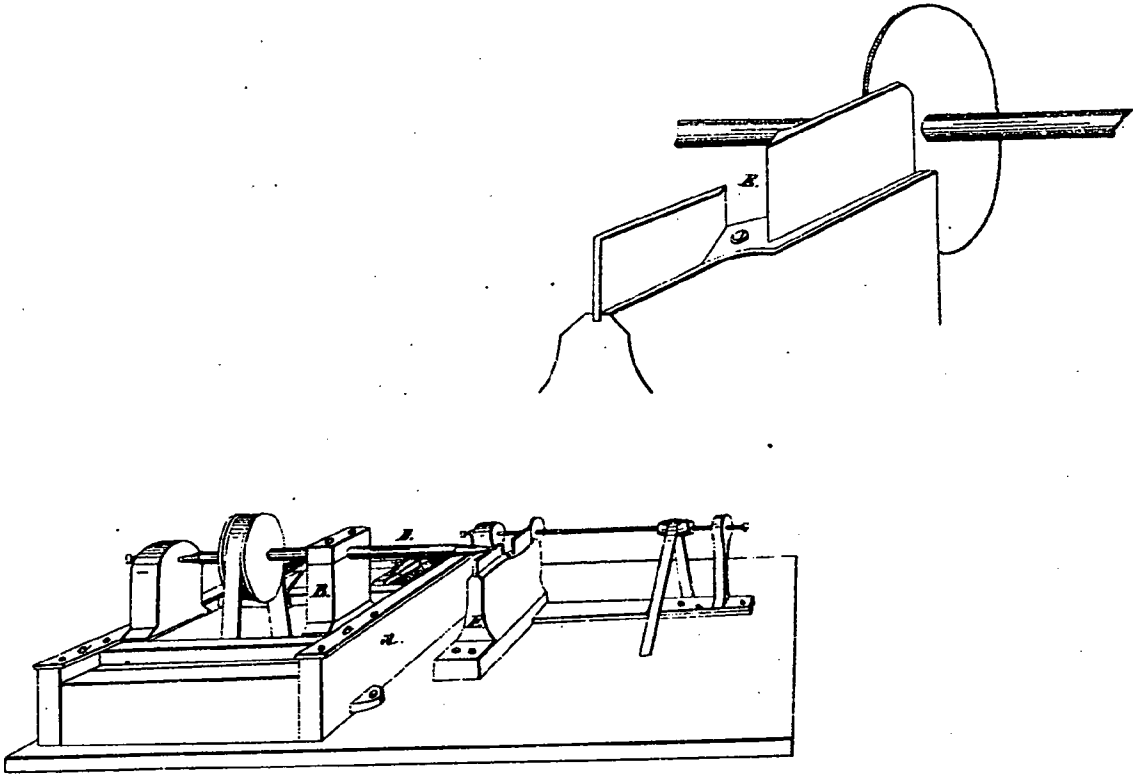
AM. PHOTO-LITHO. CO. N.Y. (OSBORNE'S PROCESS)